(12) United States Patent
Steininger

(10) Patent No.: US 7,600,536 B1
(45) Date of Patent: Oct. 13, 2009

(54) GAS DISTRIBUTION MANIFOLD FOR CAMPING

(76) Inventor: Philip Steininger, 6402 Chapman Ave., Garden Grove, CA (US) 92845

( * ) Notice: Subject to any disclaimer, the term of this patent is extended or adjusted under 35 U.S.C. 154(b) by 510 days.

(21) Appl. No.: 11/650,705

(22) Filed: Jan. 8, 2007

Related U.S. Application Data

(60) Provisional application No. 60/819,892, filed on Jul. 12, 2006.

(51) Int. Cl.
*E63B 1/00* (2006.01)

(52) U.S. Cl. .................... 137/887; 137/882; 431/344

(58) Field of Classification Search ............... 137/882, 137/887; 431/344; 126/3; 48/190
See application file for complete search history.

(56) References Cited

U.S. PATENT DOCUMENTS

| | | | |
|---|---|---|---|
| 2,469,434 A | | 5/1949 | Hansen et al. |
| 2,490,839 A | | 12/1949 | Shaffer et at. |
| 3,140,740 A | * | 7/1964 | Lagreid et al. ............... 126/6 |
| 3,417,780 A | * | 12/1968 | Lienard ..................... 137/887 |
| 3,462,117 A | * | 8/1969 | Lind ........................ 251/149.6 |
| 3,557,818 A | * | 1/1971 | Rohde ..................... 137/505.42 |
| 4,088,436 A | | 5/1978 | Alferes |
| 4,223,692 A | | 9/1980 | Perry |
| 4,553,524 A | | 11/1985 | Wheat et al. |
| 4,570,677 A | | 2/1986 | Roxton et al. |
| 4,688,308 A | | 8/1987 | Alvarez |
| 4,870,994 A | | 10/1989 | Raymond |
| 4,899,725 A | | 2/1990 | Barron, Jr. |
| 4,994,180 A | | 2/1991 | Sims et al. |
| 5,135,390 A | | 8/1992 | Rodriguez |
| 5,293,903 A | * | 3/1994 | Appelwick .................. 137/887 |
| 5,327,879 A | * | 7/1994 | Ferraro ...................... 126/41 R |
| 5,586,546 A | | 12/1996 | Ashcraft et al. |
| 5,598,869 A | * | 2/1997 | Nelson ................... 137/505.11 |
| 5,819,719 A | | 10/1998 | Vidal |
| 6,192,881 B1 | | 2/2001 | Nix |
| 6,223,766 B1 | | 5/2001 | Shaw et al. |
| 6,231,218 B1 | * | 5/2001 | Esprit .......................... 362/477 |
| 6,305,049 B1 | | 10/2001 | Koch |
| 6,637,426 B2 | | 10/2003 | Champlin |
| 6,655,925 B1 | | 12/2003 | Robenalt et al. |
| 6,719,002 B2 | | 4/2004 | Shaw |
| 6,736,155 B1 | | 5/2004 | Johnson et al. |
| 6,884,065 B2 | | 4/2005 | Vandrak et al. |

* cited by examiner

*Primary Examiner*—John Fox
(74) *Attorney, Agent, or Firm*—Stetina Brunda Garred & Brucker; Lowell Anderson

(57) ABSTRACT

A gas distribution device is provided for use with a recreational vehicle having a tank and a pressure regulator. The gas distribution device has a male inlet connected to the tank and a female outlet connected to the pressure regulator, with the inlet and outlets in fluid communication with each other. A third outlet is in fluid communication with a manually operated valve. A gas manifold with a gas passage is connected to and in fluid communication with the valve by a metal fitting. The manifold has a plurality of device connectors in fluid communication with the manifold gas passage. Each of the outlet connectors has a check valve and is configured to connect to a flexible tubular gas line. Each tubular gas line is has a first end adapted to connect to one of the device connectors and a second end adapted to connect to a portable gas appliance such as a lantern or stove.

12 Claims, 1 Drawing Sheet

GAS DISTRIBUTION MANIFOLD FOR CAMPING

CROSS-REFERENCE TO RELATED APPLICATIONS

This application claims the benefit of U.S. provisional application Ser. No. 60/819,892 filed on Jul. 12, 2006, the entire contents of which are herein incorporated by reference.

STATEMENT RE: FEDERALLY SPONSORED RESEARCH/DEVELOPMENT

Not Applicable

BACKGROUND

It is difficult to cook over campfires and thus campers carry along five-gallon portable propane tanks and/or portable and disposable seventeen-point-four (17.4) ounce propane fuel bottles when they go camping. But it is cumbersome and/or expensive to carry these propane tanks. Moreover, the tanks have one outlet so if a stove is being fueled by the tank, lanterns or other gas fed appliances cannot be simultaneously used. There is thus a need for an improved way to fuel camping appliances.

BRIEF SUMMARY

A propane gas distribution device is provided for use with a gas source of a recreational vehicle having a tank and a pressure regulator in fluid communication with appliances in the recreational vehicle. The distribution device has an in-line T-connector with a fluid passage in gas communication with three openings. The first opening is a male connector adapted to connect to the tank. The second opening is in a female connector adapted to connect to the pressure regulator. The third opening is connected to a fluid passageway through a manually actuated valve when the valve is open. The valve is connected to the T-connector through a rigid connection which forms part of the fluid passageway. Further, a manifold is rigidly connected to the valve. The manifold has a gas passage therethrough in gas communication with the passageway through the valve when the valve is open. The manifold has a plurality of device connectors in gas communication with the manifold passage. Each device connector has a check valve and is configured to connect to a flexible tubular gas line.

A pressure gauge is optionally connected to the manifold and in fluid communication with the gas passage in the manifold. Adjusting the manually operated valve allows the user to regulate the pressure to the gas appliances. Preferably, but optionally, the device connectors comprise quick-disconnect fittings, or alternatively, threaded fittings.

There is also provided a propane gas distribution device for use with a gas source of a recreational vehicle having a tank and a pressure regulator in which the device has a T-connector formed by a tube with a first tubular nipple fastened thereto and in fluid communication with a fluid passage inside the tube. A first end of the tube has a male connector adapted to connect to the tank. An opposing, second end of the tube has a female connector adapted to connect to the pressure regulator. The device further includes a manually actuated valve having a fluid passageway therethrough. The valve fluid passageway has an inlet and outlet with the inlet connected to the first nipple and the outlet connected to a second tubular nipple having a fluid passage therethrough. The device also has a manifold connected to the second nipple. The manifold has a gas passage therethrough in fluid communication with the fluid passageway in the second nipple. The manifold also has a plurality of device connectors in gas communication with the manifold gas passage. Each outlet connector has a check valve and is configured to connect to a flexible tubular gas line.

Preferably, but optionally, the first nipple is threadably connected to the T-connector and the valve, and the second nipple is threadably connected to the valve and the manifold. Moreover, the T-connector and manifold are preferably, but optionally made of brass. Further, the manifold is optionally a straight tube with at least three device outlets thereon, and preferably four outlets, with each device outlet having an externally threaded connection. Optionally, a pressure gauge is connected to the gas passage in the manifold in any of the above or below described variations. In use, a flexible gas line having a first end is connected to at least one of the device outlets. The gas line has a second end connected to a portable gas appliance. In use, the first end of the T-connector is connected to the tank and the second end is connected to the pressure regulator.

There is also provided a kit for use with a recreational vehicle having a tank and a pressure regulator. The kit includes a gas distribution device having a male inlet and a female outlet in fluid communication with each other. The distribution device also has a third outlet in fluid communication with a manually operated valve and a manifold with a gas passage connected to and in fluid communication with the valve, preferably via a metal fitting. The manifold has a plurality of device connectors in fluid communication with the manifold gas passage, with each device connectors having a check valve and being configured to connect to a flexible tubular gas line. The kit also includes a plurality of flexible fluid gas lines having a first end adapted to connect to one of the device connectors and having a second end adapted to connect to a portable gas appliance.

The kit optionally includes a pressure gauge connected to the gas manifold and in fluid communication with the gas passage in the gas manifold. Further, the gas distribution device is optionally connected to the valve by a threaded metal fitting. The gas distribution device, fittings and manifold are preferably made of brass. Ideally, the gas manifold comprises a straight tube and the device connectors are threaded into holes aligned orthogonal to a longitudinal axis of the tube.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
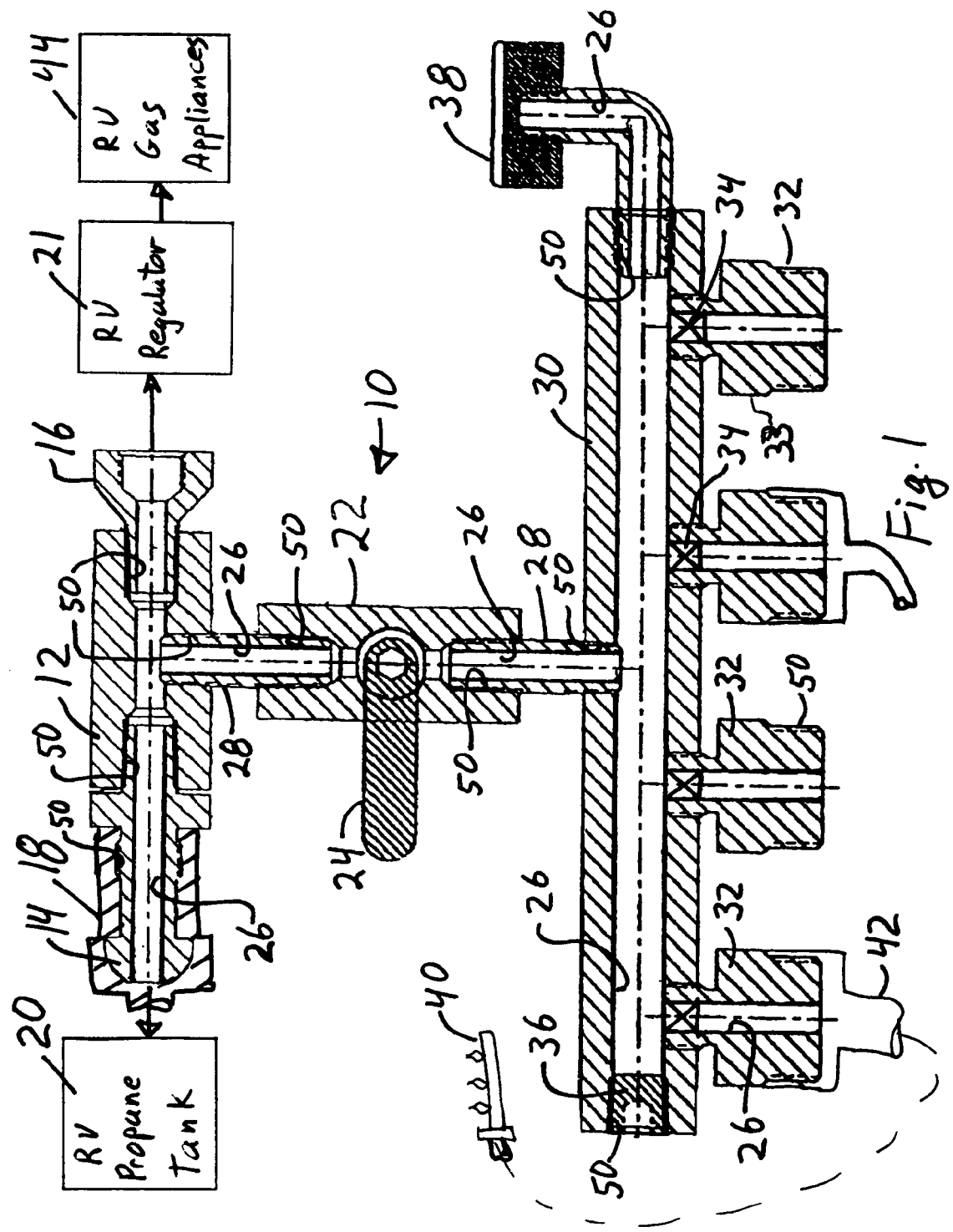
FIG. 1 is a cross-sectional view of a gas distribution device.

Referring to FIG. 1, a gas distribution device 10 comprises an in-line connector 12 having a first connector 14 and second connector 16. The first connector 14 is adapted to connect to a propane tank, preferably a tank of the type used in recreational vehicles. The first connector 14 typically comprises a male connector that extends into a female connector 18 on the RV LNG tank 20 or another propane tank where a threaded collar or rotating lock-quick disconnect fitting on the female connector engages and retains the first connector 14. The second connector 16 is adapted to connect to the pressure regulator 22 or a line in fluid communication with the regulator. The second connector 16 preferably comprises a female fitting, and thus has a threaded collar or quick disconnect fitting suitable to rotatably engage a male projection on the regulator 20 or the line connected to the regulator. In the even the regulator 20 is connected to a line having a distal end with a female fitting, and then the second connector 16 would comprise a male fitting as previously described.

The in-line connector 12 is connected to a valve 22 preferably manually actuated by manual device 24 such as a lever or knob. FIG. 1 shows a ball valve 22 actuated by manually rotating lever 24. The in line connector 12 has fluid passages 26 through it to allow gas from the tank 20 to flow to the RV regulator 20 and throughout the remaining portions of the RV, and to also flow through the valve 22. Preferably the in-line connector 12 comprises a brass T-fitting with male fitting 18 and female fitting 16 on opposing ends of the T, and the valve 22 on the leg of the T shaped fitting. Thus, the in-line connector 12 allows gas to be selectively taken from the RV tank 20 by actuating valve 22, while allowing the gas supply to the RV to continue uninterrupted, after any suitable adjustment of the gas pressure by the regulator 20.

The valve 22 is connected to a gas manifold 30 having a plurality of gas outlets, each of which is preferably, but optionally formed by a device connector 32 having a check valve 34 interposed between the device outlet and the manifold 30. FIG. 1 shows the manifold 30 as comprising a straight brass tube with a first end sealed by a plug 36. Four device connectors 32 are located along a length of the manifold 30. The connectors 32 are shown as having one end threaded into radial holes in the manifold 30 using wrenching surfaces 33, with a second end comprising the actual device connection 32 which has externally threaded male fittings adapted to connect to a female end of flexible tubing. But other connector configurations could be used, with a twist-lock, quick disconnect fitting being a preferred alternative. Such twist-lock connectors is often found on air compressors to drive pneumatic tools The manifold 30 preferably is in fluid communication with a pressure gage 38. A fluid passage 26 in the manifold 30 is in fluid communication with the fluid passage 26 of the in-line-connector 12 and valve 22 to provide gas to the outlets through device connectors 32, and in fluid communication with the pressure gauge 38 to reflect the pressure to the device connectors 32.

In use, the first connector 14 is connected to the propane tank 20 on an RV, while the second end 16 is connected to the RV regulator 20. The valve 22 is opened to allow the gas from tank 20 to flow to the device connectors 32. A portable, gas-powered appliance 40, such as a camping stove, a gas lantern, a heater, etc. is connected to one or more of the device connectors 32 by a suitable fitting. The portable appliance 40 is lit and fueled by gas from the tank 20, while the connector 12 allows gas appliances 44 in the RV to simultaneously be used. The portable gas appliance 40 is preferably connected to the manifold 30 through a flexible tube 42 of sufficient length to allow suitable use of the portable appliance 40. The nature of the portable appliance 40 will vary, but because it is portable it will be movable (e.g. carried) by a single, average person.

In a more preferred embodiment the connector 12 is a straight metal tube, preferably of brass, having threads 50 on opposing ends of the tube. A hole perpendicular to the longitudinal axis of the tubular connector 12 is also threaded with threads 50. The first connector 14 comprises a metal male fitting, preferably of brass, having one end with external threads that mate with the threads 50 on one end of the connector 12. The second connector 16 comprises a female fitting, preferably of brass, having one end with external threads that mate with the threads 50 on the other end of the connector 12. The connector 16 also has its opposing end configured to engage with the RV regulator 21 or a tubular connector carrying gas to the regulator and/or other RV appliances 44.

First and second tubular nipples 28 connect the valve to the connector 12 and manifold 30. The first and second nipples advantageously comprise a straight metal tube, preferably of brass, with two opposing ends having external threads so a first one of the threaded ends screws into the hole in the side of the tubular connector 12 to form a T-shaped connector when assembled. The second one of the ends of the nipple 28 threads into the valve 22.

In this more preferred embodiment, the valve 22 comprises a linear metal tube, preferably of brass, having two internally threaded ends with threads 50 and a lever actuated ball valve between the threaded ends. One threaded end is screwed onto an end of the first nipple 28 as described above. The other threaded end of the valve 22 end receives one end of the second nipple 28. A first one of the threaded ends screws into the valve 22 as described and the second one of the ends of the second nipple 28 threads into the manifold 30 and sealing connects thereto using threads 50.

The manifold 30 is preferably a straight metal tube, preferably of brass, with a hole in one side of the tube that has internal threads to mate with the threads on the second end of the passage 28. The connection with the nipple 28 and valve 22 is preferably near the middle of a length of the manifold 30, so gas from the nipple 28 can flow toward both ends of a preferably straight manifold 30. One end of the manifold 30 is internally threaded with threads 50 to receive threaded plug 36, also preferably of brass, to seal that end of the manifold. The other end of the manifold 30 also has internal threads 50 to receive a threaded end of pressure gauge 38.

The manifold 30 has a series of holes in fluid communication with the inside of the tubular manifold, and these holes preferably have internal threads 50 sized to receive a threaded end on one of the device connectors 32. The connectors 32 are preferably metal, ideally brass, with one connector screwing into each hole located along the length of the tubular manifold 30. Ideally, a check valve 34 is located in each device connector 32 to guard against unintentional flow of gas from the manifold 30 through the check valve 34 and connector 32. The connectors 32 each have an external thread, preferably about one inch in diameter, to mate with a female connector on the end of flexible hose or tubing 42.

The various threaded connections using threads 50 are tightened to provide a gas tight seal so the fluid passages 26 are placed in fluid communication with each other in a gas tight manner, thus allowing gas communication from the tank 20 to the regulator 21 to the valve 22, manifold 30 and out let devices 32. Teflon tape or other sealants can optionally be provided to further seal the various connections. This alternative embodiment allows a series of straight tubular parts to provide a gas distribution device 10 having a manually actuated on-off valve 22, which can be connected to an RV propane tank 20 without interrupting the flow of gas to the RV appliances 44. Further, the use of the various threaded connections by threads 50 and metal fittings 28 allows a compact and rigid gas distribution device 10 which may be held by one hand without the various parts bending, sagging or entangling other things.

The above description is given by way of example, and not limitation. Given the above disclosure, one skilled in the art could devise variations that are within the scope and spirit of the invention disclosed herein. For example, in the above described alternative embodiment, the location of the external and internal threads could be reversed, and metals other than brass could be used. Likewise, a rotating knob could replace lever 24 to actuate the valve 22. The T-Connector 12 could be integrally cast as a T-shape rather than being formed of a straight tube and a nipple 28. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A propane gas distribution device for use with a gas source of a recreational vehicle having a tank and a pressure regulator in fluid communication with appliances 44 in the recreational vehicle, comprising:

an in-line T-connector having a fluid passage in gas communication with three openings, the first opening being in a male connector adapted to connect to the tank, the second opening being in a female connector adapted to connect to the pressure regulator, the third opening connected to a fluid passageway through a manually actuated valve when the valve is open, the valve being connected to the T-connector through a rigid connection which forms part of the fluid passageway, a manifold rigidly connected to the valve and having a gas passage therethrough in gas communication with the passageway through the valve when the valve is open, the manifold having a plurality of device connectors in gas communication with the manifold passage, each device connector having a check valve and being configured to connect to a flexible tubular gas line.

2. The gas distribution device of claim 1, further comprising a pressure gauge connected to the manifold and in fluid communication with the gas passage in the manifold.

3. The gas distribution device of claim 1, wherein the device connectors comprise quick-disconnect fittings.

4. A propane gas distribution device for use with a gas source of a recreational vehicle having a tank and a pressure regulator, comprising:

a T-connector formed by a tube with a first tubular nipple fastened thereto and in fluid communication with a fluid passage inside the tube, a first end of the tube having a male connector adapted to connect to the tank, the second end of the tube having a female connector adapted to connect to the pressure regulator;

a manually actuated valve having fluid passageway therethrough with an inlet and outlet with the inlet connected to the first nipple and the outlet connected to a second tubular nipple having a fluid passage therethrough;

a manifold connected to the second nipple, the manifold having a gas passage therethrough in fluid communication with the fluid passageway in the second nipple, the manifold having a plurality of device connectors in gas communication with the manifold gas passage, each outlet connector having a check valve and being configured to connect to a flexible tubular gas line.

5. The gas distribution device of claim 4, wherein the first nipple is threadably connected to the T-connector and the valve, and the second nipple is threadably connected to the valve and the manifold.

6. The gas distribution device of claim 4, wherein the T-connector and manifold are made of brass.

7. The gas distribution device of claim 4, wherein the manifold is a straight tube with at least three device outlets thereon, each device outlet having an externally threaded connection.

8. The gas distribution device of claim 7, further comprising a pressure gauge connected to the gas passage in the manifold.

9. The gas distribution device of claim 7, further comprising a flexible gas line having a first end connected to at least one of the device outlets, the gas line having a second end connected to a portable gas appliance.

10. The gas distribution device of claim 7, wherein the first end of the T-connector is connected to the tank and the second end is connected to the pressure regulator.

11. The gas distribution device of claim 4, further comprising a pressure gauge connected to the gas passage in the manifold.

12. The gas distribution device of claim 4, further comprising a flexible gas line having a first end connected to at least one of the device outlets, the gas line having a second end connected to a portable gas appliance.

* * * * *